FIG. 1

FIG. 2

United States Patent Office 3,314,796
Patented Apr. 18, 1967

3,314,796
DIRECT POSITIVE EMULSIONS
Johannes Götze, Bergisch Neukirchen, and August Randolph and Oskar Riester, Leverkusen, Germany, assignors to AGFA Aktiengesellschaft, Leverkusen, Germany, a corporation of Germany
Filed Mar. 13, 1963, Ser. No. 264,974
Claims priority, application Germany, Apr. 11, 1962, A 39,928
7 Claims. (Cl. 96—101)

The invention relates to improved direct positive emulsions, characterised by the use of special sensitisers which contain substituted indole derivatives.

Many dyestuffs have been proposed for sensitising the usual negative emulsions, which have a graduation curve of the type shown in FIGURE 1. Examples of such dyestuffs are mono- or trimethinecyanines, merocyanines or rhodacyanines. Due to solarisation effects and the like, these ordinary sensitisers cannot always be used satisfactorily to sensitise direct positive emulsions, i.e. emulsions which are processed to form positive images after the usual exposure to light and development. Use of these sensitisers with this type of emulsion has a number of defects, there is, for example, discolouration of the white areas, a general flattening of the graduation curve or a new rise after the fall of the graduation curve, as is shown, for example, by the dotted curve b in FIGURE 2. These effects may be produced immediately but in many cases only after storage.

Special sensitisers for direct positive emulsions were developed to overcome these difficulties. The sensitisers known, for example, from German patent specification No. 1,008,118 allow only panchromatic sensitisation of direct positive emulsions which contain colour couplers. The known dyestuffs are practically useless or orthochromatic sensitisation of direct positive emulsions without colour couplers.

From Soviet Zone patent specification No. 758,747 it is known to use very large quantities of symmetrical or asymmetrical carbocyanines to sensitise direct reverse emulsions. This process is of no practical interest because the dyestuffs colour the emulsions so intensely that it is not possible to obtain satisfactory white image areas. Moreover, although the increase in the quantity of sensitiser increases the sensitivity and reduces the fog, the maximum blackening obtainable is also greately reduced, so that a flat and short gradation curve and hence images of unsatisfactory quality are obtained.

An object of the present invention is to provide new sensitising dyes. A further object is to provide a photographic emulsion comprising a direct positive emulsion layer sensitised with a novel phenylindol sensitiser.

We now have found that dyestuffs of the following general formula are excellent for sensitising direct positive emulsions which enable positive images to be produced directly, preferably by the solarisation effect:

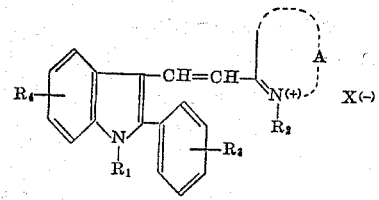

In this formula, $R_1$ represents a lower alkyl radical preferably methyl and $R_2$ lower alkyl radicals having up to 5 carbon atoms which may be substituted by an acid radical, such as carboxyl or sulpho groups; $R_3$ A represents the atoms necessary to complete a heterocyclic nitrogen containing nucleus of the type used in the production of cyanine dyes. Such nucleus are, for example, oxazole, benzoxazole, naphthoxazole, thiazole, thiazoline, benzthiazole, naphthiazole, indolenine, selenazole, benselenazole, thiodiazole, oxodiazole, pyridine or quinoline; $X^{(-)}$ is only present in the cases where $R_2$ is an alkyl group which is not substituted by acid groups and stands for any desired anion, for example, a halide or alkyl-sulphate ion. The nature of this anion scarcely, if at all, influences the effectiveness of the sensitiser.

The phenyl rings of the indole moiety of the above sensitiser, namely both the phenyl ring of the indole structure and that in the 2-position, may be substituted. The former may be substituted in any desired position by, for example, halogen atoms or by alkyl or alkoxy groups, the latter, preferably in the p-position, by alkyl, alkoxy, aryl groups or by halogen atoms.

Individual examples of dyestuffs are given below:

DYESTUFF 1

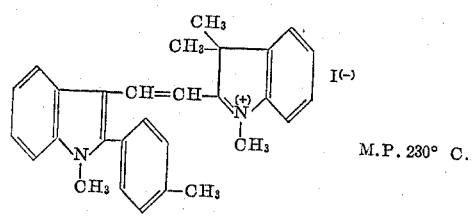

M.P. 230° C.

DYESTUFF 2

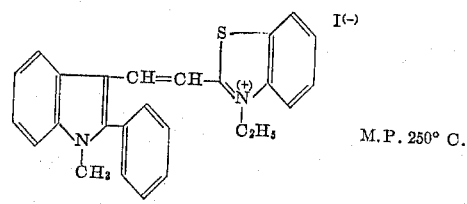

M.P. 250° C.

DYESTUFF 3

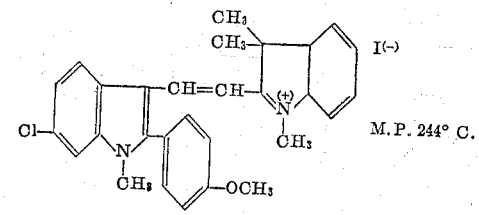

M.P. 244° C.

DYESTUFF 4

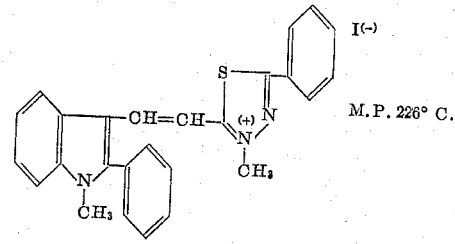

M.P. 226° C.

DYESTUFF 5

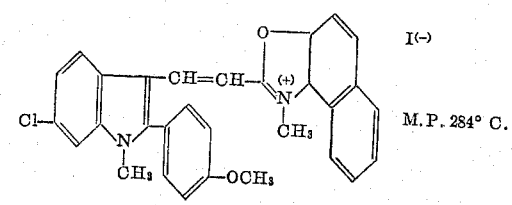

M.P. 284° C.

DYESTUFF 6

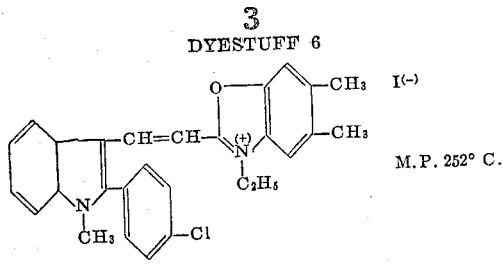

M.P. 252° C.

DYESTUFF 7

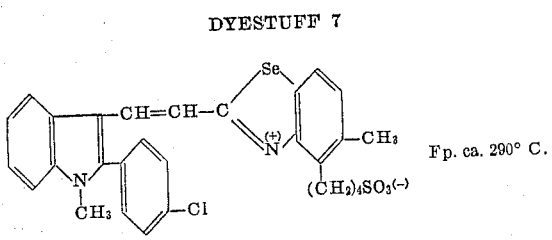

Fp. ca. 290° C.

Various processes may be used to manufacture these dyestuffs.

Indoles, e.g., 1-methyl-2-p-methylphenyl-indole or 1-methyl-2-p-methoxyphenyl-6-chloroindole may be heated, in solution in acetic anhydride and in the presence of mineral acids, with aldehydes such as 2-formylmethylene-1:3:3-trimethylindoline. Alternatively, 1-methyl-2-aryl-3-formylindole may be condensed with 2-methyl-cyclo-ammonium salts in acetic anhydride, as is represented by the following formulae:

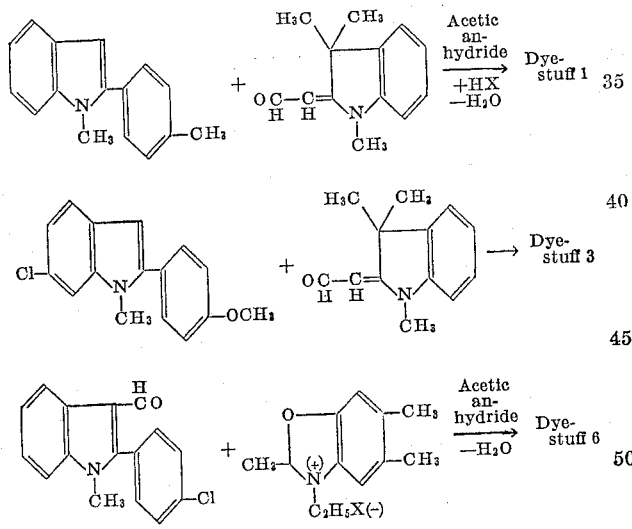

Other dyestuffs corresponding to the general formula may be obtained by one of these processes.

It was particularly surprising to find that the dyestuffs according to the invention are suitable for this purpose since compounds of this type have only a very feeble sensitising effect, and sometimes no effect at all, on the usual negative emulsions.

The preparation of direct positive emulsions which may be sensitised by the dyestuffs according to the invention has been described, for example, in German patent specifications Nos. 606,392 and 642,222 and in British patent specifications Nos. 581,773 and 655,009.

In the preparation of the emulsions, the sensitising dyes may be added to the emulsion in form of a solution. Suitable solvents are alcohols, for example, methyl or ethyl alcohol which may be anhydrous or diluted with a small amount of water. In actual practice the sensitising dyes are applied to the emulsion during any stage of its production, however, they are preferably added to the casting solution. The sensitising dyes are effective in amounts of 10–100 mg., preferably 20–60 mg. per kg. of emulsion.

The advantageous effect of the sensitisers according to the invention for direct positive emulsions will be evident on comparing the dyestuffs 1 and 3 according to the invention with an orthochromatic sensitising dyestuff for negative emulsions as shown in FIGURES 1 and 2.

FIGURE 1 shows the gradation curve (a–d) of a negative emulsion of 17° DIN. The emulsion contains per kilogram of casting solution, 0.3 mol silver halide with an iodine content of 4 mol percent, calculated on the silver content. The continuous curve (a) represents the unsensitised emulsion; the curve (b) in dotted line represents an emulsion which contains 20 mg. of an orthochromatic sensitising dyestuff for negative emulsion; curve (c) represents an emulsion which contains 20 mg. of dyestuff 1 per litre of emulsion, and curve (d) represents an emulsion which contains 20 mg. of dyestuff 3 per mg.

It is readily apparent from the curves that, in negative emulsions, the carbocyanine dyestuff (curve b) provides an increase in sensitivity over the unsensitised emulsion, whereas the two dyestuffs according to the invention reduce the general sensitivity.

FIGURE 2 shows the gradation curves of a direct positive emulsion (curve a) unsensitised and with the same additives as shown in FIGURE 1. It is found that, in this type of emulsion, the dyestuffs 1 and 3 (curves c and d) according to the invention considerably increase the sensitivity without altering the shape of the gradation curve, whereas the known sensitisers produce another rise in the curve with a second reversal (curve b). With such a gradation curve, it is not possible to produce clear white image areas.

A direct positive emulsion whose effect is based on the solarisation principle was used. It was prepared by producing a chemical fog by means of ammonia and excess silver nitrate at elevated temperatures. The emulsion contains, per kg. of casting solution, 0.4 g. mol silver halide with an iodine content of 2.5 mol percent calculated on the silver.

The direct positive emulsions are prepared according to known methods. The silver halide composition is not critical, the emulsion may consist of silver chloride, silver bromide, silver iodide or mixtures thereof. Preferred are emulsions which contain at least 50% silver bromide. The term "direct positive emulsions" comprises fogged emulsions which are developable without prior exposure. The fogging of the emulsions can be accomplished by exposure or chemically by increasing the pH value of the emulsions or by the addition of reducing agents, such as stannous compounds.

We claim:

1. A photographic element containing at least one supported direct positive silver halide emulsion layer, said emulsion layer containing a sensitiser of the following general formula:

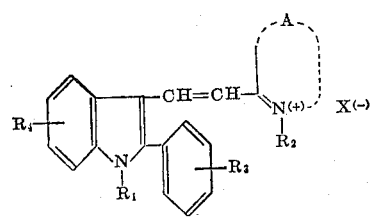

wherein $R_1$ represents a lower alkyl radical having up to 3-carbon atoms; $R_2$ stands for a radical selected from the class consisting of lower alkyl, carboxyl substituted lower alkyl and sulfo substituted lower alkyl, lower alkyl in each case having up to 5-carbon atoms; $R_3$ represents a radical selected from the group consisting of hydrogen, alkyl and alkoxy; $R_4$ represents a radical selected from the group consisting of hydrogen and halogen; A constitutes the atoms necessary to complete the heterocyclic nitrogen containing nucleus of the type used in the production of cyanine dyes; X is only present in the cases where $R_2$ is an alkyl radical which is not substituted by sulfo or carboxyl groups and stands for an anion.

2. A photographic element according to claim 1 containing a dyestuff of the formula:

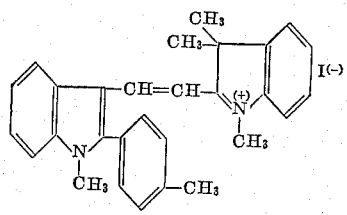

3. A photographic element according to claim 1 containing a dyestuff of the formula:

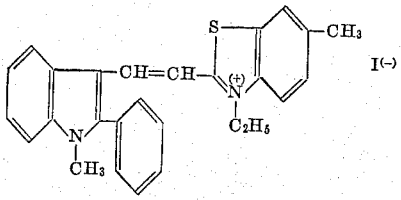

4. A photographic element according to claim 1 containing a dyestuff of the formula:

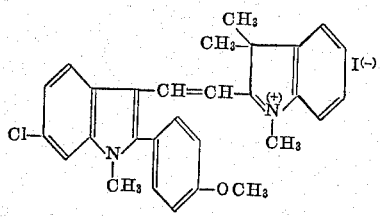

5. A photographic element according to claim 1 containing a dyestuff of the formula:

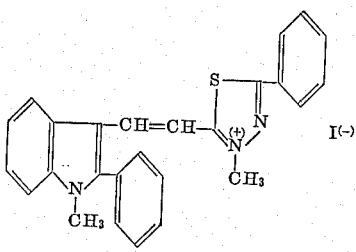

6. A photographic element according to claim 1 containing a dyestuff of the formula:

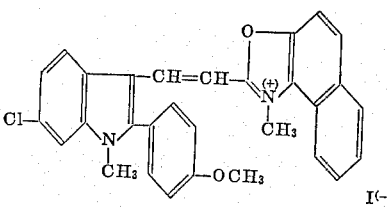

7. A photographic element according to claim 1 containing a dyestuff of the formula:

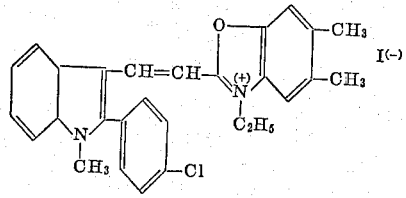

References Cited by the Examiner

UNITED STATES PATENTS

| | | | |
|---|---|---|---|
| 2,323,187 | 6/1943 | Arens et al. | 96—64 |
| 2,930,695 | 3/1960 | Coenen et al. | 96—106 |
| 2,954,292 | 9/1960 | Duffin et al. | 96—64 |
| 3,090,782 | 5/1963 | Coenen et al. | 260—240 |
| 3,113,825 | 12/1963 | Streck | 260—240.9 |

FOREIGN PATENTS

| | | |
|---|---|---|
| 529,197 | 6/1954 | Belgium. |
| 865,925 | 12/1952 | Germany. |
| 873,937 | 8/1961 | Great Britain. |

NORMAN G. TORCHIN, *Primary Examiner.*

A. LIBERMAN, D. D. PRICE, J. H. RAUBITSCHEK,
*Assistant Examiners.*